United States Patent [19]
Enomoto

[11] Patent Number: 5,583,597
[45] Date of Patent: Dec. 10, 1996

[54] BLUR CORRECTING APPARATUS AND METHOD FOR CAMERA

[75] Inventor: Shigeo Enomoto, Tokyo, Japan

[73] Assignee: Asahi Kogaku Kogyo Kabushiki Kaisha, Tokyo, Japan

[21] Appl. No.: 322,333

[22] Filed: Oct. 13, 1994

[30] Foreign Application Priority Data

Oct. 13, 1993 [JP] Japan .................................. 5-255935

[51] Int. Cl.$^6$ ..................................................... G03B 5/00
[52] U.S. Cl. ........................................................ 396/55
[58] Field of Search .................................. 354/430, 202; 359/554–557; 348/208

[56] References Cited

U.S. PATENT DOCUMENTS

| | | | |
|---|---|---|---|
| 4,996,545 | 2/1991 | Enomoto et al. | 354/70 |
| 5,039,211 | 8/1991 | Maruyama | 359/557 |
| 5,150,150 | 9/1992 | Enomoto | 354/456 |
| 5,231,445 | 7/1993 | Onuki et al. | 354/430 X |
| 5,280,387 | 1/1994 | Maruyama | 359/554 |
| 5,305,040 | 4/1994 | Enomoto | 354/202 |

FOREIGN PATENT DOCUMENTS

| | | |
|---|---|---|
| 62-44707 | 2/1987 | Japan . |
| 63-158518 | 7/1988 | Japan . |
| 2157732 | 6/1990 | Japan . |
| 6-35022 | 2/1994 | Japan . |

*Primary Examiner*—W. B. Perkey
*Attorney, Agent, or Firm*—Greenblum & Bernstein P.L.C.

[57] ABSTRACT

A blur correcting apparatus for a camera which includes a shake detecting mechanism and a blur correcting optical element which is movable in a plane normal to the optical axis of the camera. Also included are a mechanism for filtering the output of the shake detecting mechanism, a mechanism for moving the blur correcting optical element based upon the output of the filtering mechanism, and a mechanism for switching the frequency range to be filtered from the output of the shake detecting mechanism by the filtering mechanism before and after activation of the shutter release switch of the camera.

14 Claims, 8 Drawing Sheets

BLUR CORRECTING APPARATUS AND METHOD FOR CAMERA

BACKGROUND OF THE INVENTION

1. Field of the Invention

The present invention is directed to a blur correcting apparatus and method used for cameras which prevent an image on a film plane from blurring due to a displacement of an optical axis of a photographing optical system of a camera, caused, for example, by camera shakes.

2. Description of Related Art

When a picture is taken by a camera, in particular, when the camera is being hand held without using a tripod, an accidental movement of the optical axis of the photographing optical system of the Camera tends to occur due to camera shakes which are caused particularly when the camera is not held stably by the photographer, a picture of a dark object is taken at a slow shutter speed or the photographer takes a picture while moving, etc. The blurred picture is not clearly seen due to the streaked image. The blur caused by the camera shake can be eliminated to some extent, by the hardware solution of using a bright lens, or increasing the film sensitivity to increase the shutter speed, or the software solution of improving the photographer's skill.

A blur correcting apparatus which can prevent the occurrence of blurring due to camera shakes has been proposed, in which the angular velocity or the acceleration of the camera is detected and the blur correcting lens is moved in an opposite direction to the direction of the camera shake to prevent a movement of the image on the film plane.

When this type of blur correcting apparatus is used, in which the occurrence of blurring can be prevented by detecting the camera shake by means of an angular velocity or acceleration sensor, the value of the angular velocity or acceleration detected by the sensor does not turn out to be zero due to the difference of the actual voltage from the theoretical demand voltage. This will occur, for example, when there is a DC (direct current) voltage present when there is no camera shake, i.e., when the sensor is supposed to detect no angular velocity or acceleration.

The above noted DC voltage error is defined as the null voltage when the acceleration and velocity is zero but the sensor signal indicates a voltage. For this reason, when an angular velocity or acceleration signal is converted to a deviation amount of the blur correcting lens, the angular velocity or acceleration signal is converted together with the DC voltage error. Since an angular velocity or acceleration signal is usually quite small, a larger error than the null voltage error occurs in the signal for blur correction when the angular velocity or acceleration signal is amplified together with such a DC output as DC voltage error. In the blur correcting apparatus, the blur correcting lens is moved in the opposite direction to that of the camera shake to prevent a movement of the image on the film plane, in accordance with an angular velocity or acceleration measured by the blur correcting apparatus. Because of this structure, in the blur correcting apparatus, when the above-noted large error occurs, the occurrence of blurring can not accurately be prevented.

In order to overcome the foregoing problem, generally, such a circuit as a DC blocking filter circuit (CR direct current blocking filter circuit) consisting of a condenser $C_o$ and a resistor $R_o$ (shown in FIG. 8) is installed in a blur correcting apparatus. This DC filter circuit is a high-pass filter, and therefore, it allows a high frequency component to pass while removing a low frequency component including such a direct current component as the DC voltage error. However, the DC blocking filter circuit also removes some low frequency components of the output of the angular velocity or acceleration sensor, which is generated due to an actual camera shake and thus should not to be removed at the same time. When the time constant ($C_oR_o$) of the DC blocking filter is especially small, the range of the frequency band through which a low frequency component is allowed to pass is moved to a higher frequency, thereby the above low frequency component of an output generated due to an actual camera shake is incorrectly removed. For this reason, according to the blur correcting apparatus having such a circuit as the above noted DC blocking filter circuit means that an accurate output of the angular velocity or the acceleration sensor cannot be obtained even though such a direct current component as the DC voltage error is removed. Consequently, the output signal for controlling the blur correcting lens would still be imprecise.

Provided the time constant of the DC blocking filter shown in FIG. 8 is "T" and the cutoff frequency of the same is "fc", since the time constant "T" and the cuttoff frequency "fc" are represented by "$C_o \times R_o$" and "$1/(2\pi \times T)$", respectively, the cutoff frequency "fc" is represented by the following equation:

$$fc=1/(2\pi \times C_o \times R_o)$$

and the transmission function of the DC blocking filter circuit is represented by the following equation:

$$VO/VI=T_s/(T_s+1)$$

wherein "VI" represents an input voltage and "VO" represents an output voltage.

If the frequency of a camera shake which is subject of blur correction falls within a low frequency band, for instance, a band ranging from approximately 0.5 Hz (low limit) to 20 Hz (top limit), since $fc=1/(2\pi \times T)$, the time constant T is 0.3 seconds. In the case where the shutter speed is a slow speed for instance, about 1 to 2 seconds, it is necessary to make the above low limit even lower. For this reason, it takes a long time approximately ten times longer than the time constant T, for the direct current output component to be approximately zero and therefore having substantially no influence upon the result of the angular velocity or acceleration integral. Therefore, immediately after the main switch of the camera is turned ON or the camera is panned in one direction by a great amount for the purpose of determining or changing the composition of a picture, it takes a long time for the residual direct current output to fall to substantially zero. Therefore, it is possible for a photographer to miss a good photograph during the time he or she is waiting for the direct current output component to fall to substantially zero.

SUMMARY OF THE INVENTION

It is an object of the present invention to provide a blur correcting apparatus for a camera which eliminates the influence of the residual direct current output, for example caused by such a DC output as the DC voltage error and or panning prior to taking a picture. A further object of the invention is to provide a blur correcting operation while still being effective at detecting the low frequency output signals outputted from the shake detecting mechanism such as an angular velocity or acceleration sensor.

To achieve the object mentioned above, according to the present invention, there is provided a blur correcting apparatus of a camera which includes: a shake detecting mechanism; a blur correcting optical element which is movable in a plane normal to an optical axis of the camera; a mechanism for filtering an output from the shake detecting mechanism; a mechanism for moving the blur correcting optical element based upon an output of the filtering mechanism; and a mechanism for switching the frequency range to be filtered from an output of the shake detecting mechanism by the filtering mechanism before and after an activation of the shutter release switch of the camera.

The mechanism for switching the frequency range is operated An association with the shutter release switch and further comprises a photometering switch. The filtering mechanism includes: a first differential amplifier which outputs a difference between the first output outputted from this first differential amplifier and a second output; an integrating mechanism for integrating the output from the differential amplifier and outputting the second output; an integral sensitivity changing mechanism for changing an integral sensitivity of the integrating mechanism from high sensitivity to low sensitivity at a first predetermined time; a memory mechanism for storing a value of an output outputted from the integrating mechanism at a second predetermined time; a second differential amplifier which outputs a difference between an output outputted from the memory mechanism and an output outputted from the integrating mechanism; and, a mechanism for driving the blur correcting optical system in accordance with an output outputted from the second differential amplifier.

To achieve the object mentioned above, according to the present invention, there is provided a blur correcting method for a camera comprising the steps of: filtering a first specific frequency range from an output from the shake detecting mechanism by the filtering mechanism before an activation of the shutter release switch of the camera and filtering a second specific frequency range from an output from the shake detecting mechanism by the filtering mechanism and which is different from the first specific frequency range after an activation of the shutter release switch of the camera.

The present disclosure relates to subject matter contained in Japanese patent application No. 05-255935 (filed on Oct. 13, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 3:
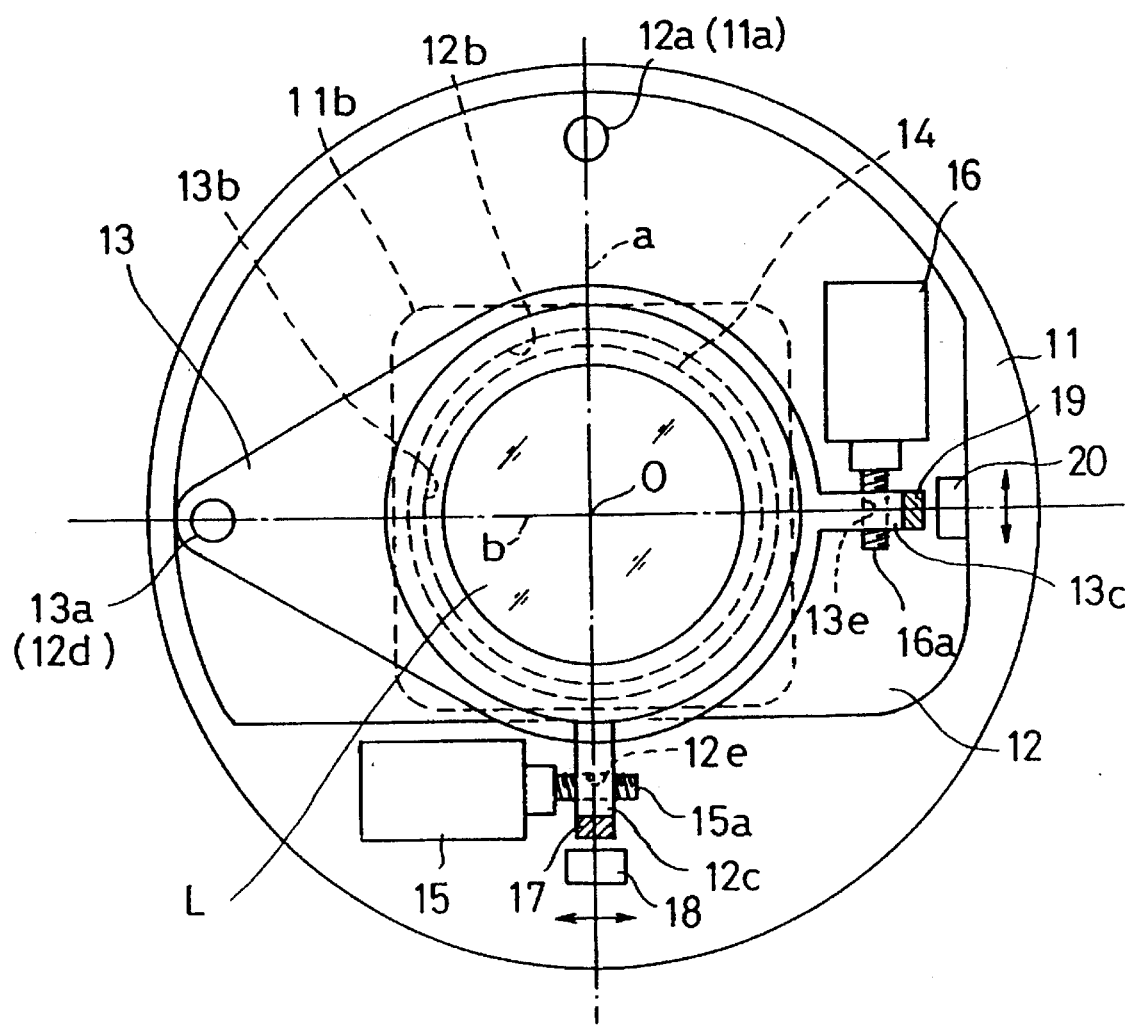
FIG. 3 is a front elevational view of the blur correcting lens driving mechanism of the blur correcting apparatus.

FIG. 3 shows a blur correcting lens driving apparatus provided in a blur correcting apparatus to which the present invention is applied. The blur correcting lens driving apparatus is provided between a picture taking lens or a photographing optical system (not shown) and the film or an image pickup device (not shown) which is located at an image forming plane on which an image of an object to be taken is formed by the picture taking lens or optical system.

Figure 4:
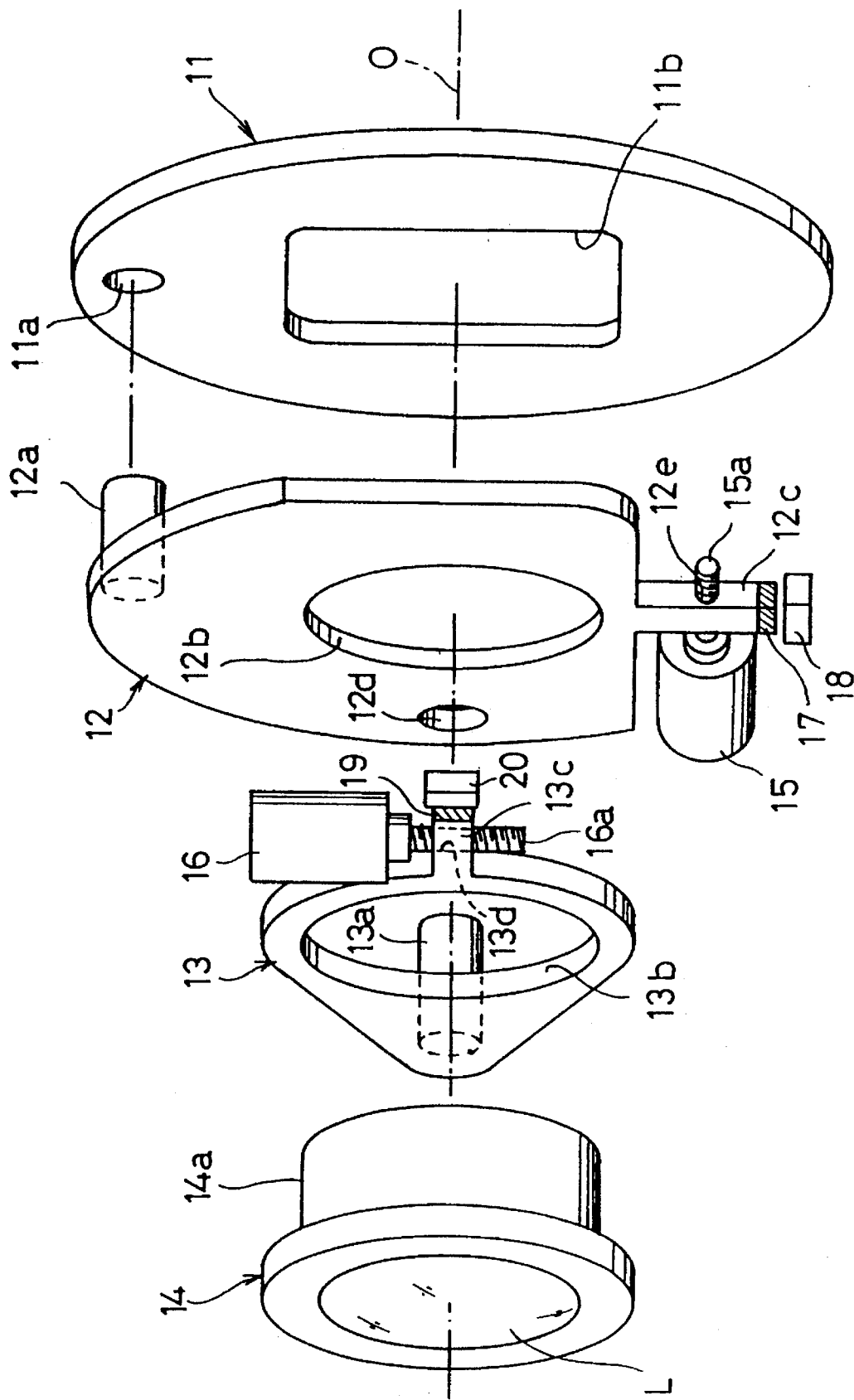
FIG. 4 is an exploded isometric view of the blur correcting lens driving mechanism shown in FIG. 3.

In FIGS. 3 and 4, "L" designates a blur correcting lens. The blur correcting lens L is driven to move in an opposite direction to the direction of the camera shake to prevent a movement of the image on the film plane.

A supporting member 11 is a disk-shaped member which supports the blur correcting lens L. The supporting member 11 is provided, with a first hole 11a and a center opening 11b whose center is located on an optical axis O of the picture taking lens. The first hole 11a is offset from the optical axis O outside the center opening 11b. The axis of the first hole 11a extends parallel to the optical axis O. The supporting member 11 is secured to an immovable part of the picture taking lens, such as an outer lens barrel (not shown) of the picture taking lens, or the camera body (not shown).

The first rotary disk 12 has a first rotating shaft 12a which is provided in the vicinity of the outer peripheral edge and is rotatably fitted into the first hole 11a of the supporting member 11. Consequently, the first rotary disk 12 is rotatable about the axis of the first rotating shaft 12a within a plane perpendicular to the optical axis O. The first rotary disk 12 is provided with a circular opening 12b with a center which is substantially coaxial to the optical axis O, a driving arm 12c which is located on the side opposite to the rotating shaft 12a with respect to the optical axis O, and a second hole 12d.

The second hole 12d is formed such that the second hole 12d is placed on a straight line "b" and is offset from and parallel to the optical axis O when a straight line "a" is made coincident with a vertical direction. The straight line "a" is a line on which the first rotating shaft 12a (or the first hole 11a) and the driving arm 12c are located. The straight line "b" is a line which intersects the optical axis O and falls at right angles with the straight line "a" on the first rotary disk 12. The driving arm 12c is provided with a female screw 12e. The female screw 12e is formed such that the axis of the female screw 12e extends in a direction perpendicular to the straight line "a" when the first rotary disk 12 is in the state shown in FIG. 3, in which the first rotating shaft 12a and the driving arm 12c are located on the straight line "a".

A second rotary disk 13 has a second rotating shaft 13a which is provided An the vicinity of the outer peripheral edge thereof and rotatably fitted in the second hole 12d of the first rotary disk 12. Consequently, the second rotary disk 13 is rotatable about the axis of the second rotating shaft 13a within a plane perpendicular to the optical axis O. The second rotary disk 13 is provided with a center circular opening 13b with a center which is substantially coaxial to the optical axis O, and a driving arm 13c which is located on the side opposite to the second rotating shaft 13a with respect to the optical axis O.

The driving arm 13c is provided with a female screw 13e. The female screw 13e is formed such that the female screw 13e extends in a direction perpendicular to the straight line "b" when the second rotating shaft 13a and the driving arm 13c are located on the straight line "b". A blur correcting lens frame 14 supports a blur correcting lens L and has a barrel portion 14a whose center axis is coaxial to the optical axis O. The barrel portion 14a is fitted in and secured to the circular opening 13b. Namely, the blur correcting lens frame 14 is supported by the supporting member 11 through the second rotary disk 13 and the first rotary disk 12.

The barrel portion 14a is loosely fitted in the center opening 12b of the first rotary disk 12 and the center opening 11b of the supporting member 11, so that the blur correcting lens frame 14 is movable (rotatable) through a predetermined angular displacement about the axes of the second and first rotating shafts 13a and 12a. Namely, the inner diameter of the center opening 12b of the first rotary disk 12 is made slightly larger than the outer diameter of the barrel portion 14a so that the second rotary disk 13 can be rotated through a small angular displacement (e.g., a few millimeters) about the axis of the rotating shaft 13a (axis of the second hole 12d).

The supporting member 11 is provided thereon with a first driving motor 15 having a driving screw shaft 15a which is engaged with the female screw 12e of the driving arm 12c. The driving screw shaft 13a a extends parallel to the straight line "a". The first rotary disk 12 is provided with a second driving motor 16 having a driving screw shaft 16a which is engaged with the female screw 13e of the driving arm 13c. The driving screw shaft 16a extends parallel to the straight line "b". With this structure, when the screw shafts 15a and 16a are rotated, the first and second rotary disks 12 and 13 can be rotated about the axes of the first rotating shaft 12a (first hole 11a) and the second rotating shaft 13a (second hole 12d), respectively.

Strictly speaking, when the rotation of the first or second rotary disks 12 and 13 takes place, the screw shafts 15a, 16a and the corresponding female screws 12e, 13e of the driving arms 12c and 13c are not exactly aligned. This is however negligible when the angular displacement of the driving arms 12c and 13c is small with respect to the radius of rotational movement. On the other hand, if the angular displacements of the driving arms 12c and 13c are large, the motors 15 and 16 are preferably mounted to the rotary disks 12 and 13 through pivot shafts, or flexible joints (not shown) are preferably provided between the drive shafts of the motors 15, 16 and the screw shafts 15a, 16a to absorb the angular displacements of the driving arms 12c and 13c, respectively.

As mentioned above, the blur correcting apparatus as constructed above is provided between the picture taking lens and a film or an image pickup element (not shown), which is located at an image forming position at which an image of an object to be taken is formed by the picture taking lens. Furthermore, the blur correcting apparatus is placed, for example, in a manner such that the straight lines "a" and "b" are identical to the vertical and horizontal axes, respectively.

When the first driving motor 15 is actuated with an output which corresponds to the direction and magnitude of the horizontal component of the camera shake (movement of the optical axis of the taking lens) to rotate the first screw shaft 15a of the first driving motor 15, the first rotary disk 12 and accordingly the blur correcting lens L are rotated about the axis of the first rotating shaft 12a through the driving arm 12c in a direction to cancel the horizontal component of the camera shake. Since the second rotary disk 13 to which the blur correcting lens L is secured is supported on the first rotary disk 12, the blur correcting lens L is moved together with the first rotary disk 12 in the horizontal direction.

Similarly, when the second driving motor 16 is actuated by an output corresponding to the direction and magnitude of the vertical component of the camera shake to rotate the second screw shaft 16a of the second driving motor 16, the second rotary disk 13 to which the blur correcting lens L is rotated about the axis of the second rotating shaft 13a through the driving arm 13c in a direction to offset the vertical component of the camera shake. The movement of the second rotary disk 13 (blur correcting lens L) occurs within the center opening 12b of the first rotary disk 12 without moving the first rotary disk 12.

The driving arms 12c and 13c are provided at the ends thereof with permanent magnets 17 and 19, respectively. An M.R. (i.e., magneto resistance) sensor 18 is fixed to the supporting member 11 on the portion of the surface facing the permanent magnet 17. An M.R. sensor 20 similar to the M.R. sensor 18 is fixed to the first rotary disk 12 on the portion of the surface facing the permanent magnet 19. The M.R. sensors 18 and 20 vary their outputs in accordance with the positions of the permanent magnets 17, 19 and also the positions of their magnetic poles, respectively. When the blur correcting lens L is located at the center of a blur correctable range, the outputs of the M.R. sensors 18 and 20 become zero volt. The M.R. sensors 18, 20 and the permanent magnets 17, 19 constitute a position detecting device which detects the center of the blur correctable range of the blur correcting lens L and also the deviation amount of the blur correcting lens L from the above center.

Figure 1:
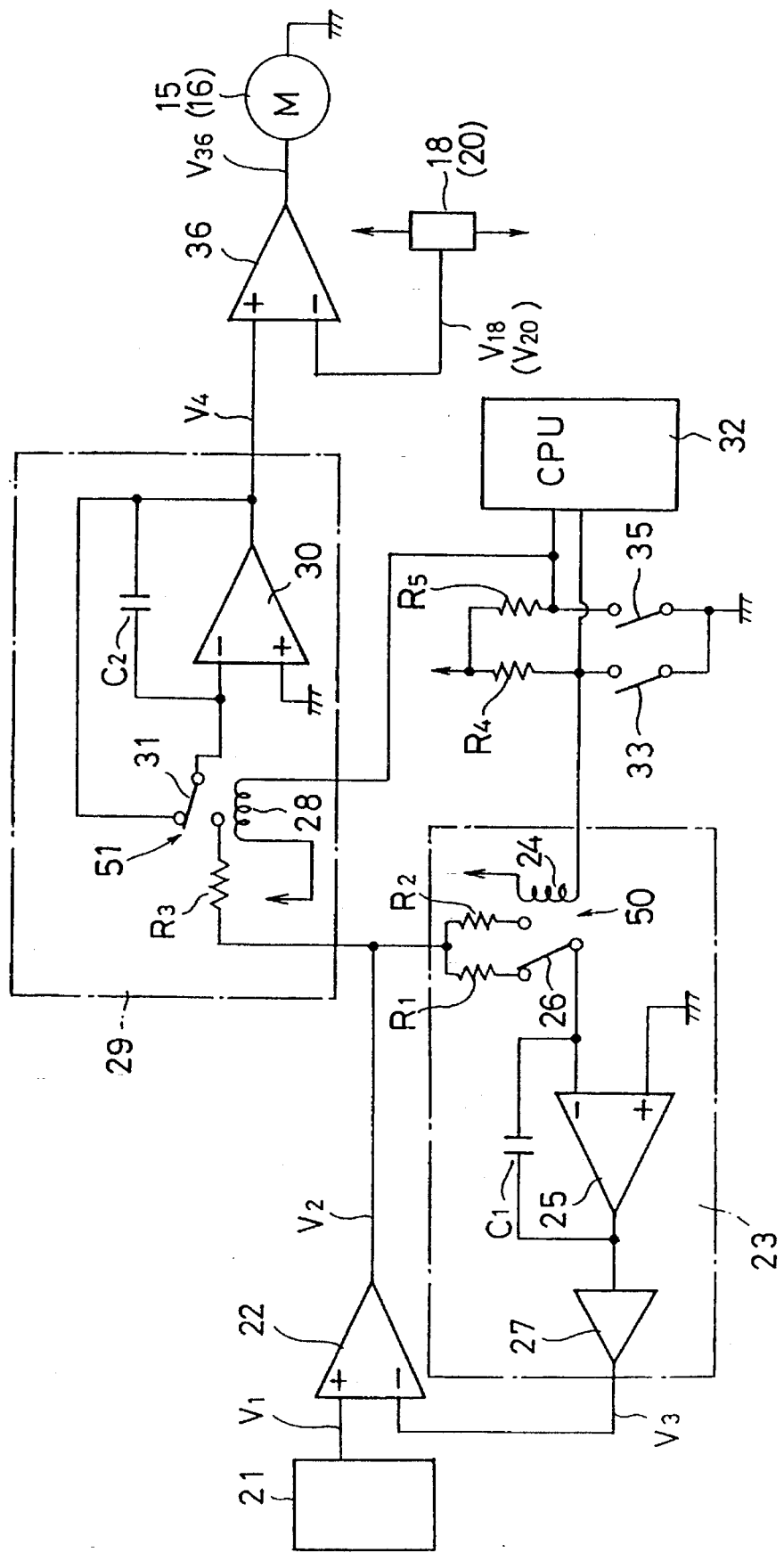
FIG. 1 is an electronic circuit of a blur correcting apparatus of a camera according to the first embodiment of the present invention.

The camera (not shown), which includes the blur correcting apparatus of the present invention, is provided with an angular velocity sensor 21 as shown in FIG. 1 which detects an angular velocity ($\omega$). The first and second driving motors 15 and 16 are controlled by a controlling circuit so as to move the blur correcting lens L in order to prevent an image on a film plane from blurring in accordance with the output of the angular velocity sensor 21. The above controlling circuit will be discussed below in detail in accordance with the block diagram shown in FIG. 1.

In FIG. 10 a control diagram which is necessary to control only the first driving motor 15 controlled by the output corresponding to the magnitude and direction of a camera shake in the horizontal direction is shown. A control diagram similar to the circuit shown in FIG. 1 is used as a circuit controlling the second driving motor 16. The only difference between this controlling circuit and the circuit shown in FIG. 1 is the direction of a camera shake which is subject to the blur correcting control.

In FIG. 1, numeral 22 designates a differential amplifier, numerals 23 and 29 integrating circuits, numeral 32 a CPU, numeral 33 a photometering switch, numeral 35 a releasing switch, and numeral 36 a driver for driving a motor. The photometering switch 33 and the releasing switch 35 are associated with a release button (not shown) of the camera, so that the photometering switch 33 is turned ON when the release button 27 is depressed half way and the release switch 35 is turned ON when the release button is fully depressed.

The differential amplifier 22 inputs the output $V_1$ outputted from the angular velocity sensor 21 to the non-inverting input terminal (+) of the differential amplifier 22 to output the difference (i.e., differential input voltage) between the above input and the output $V_3$ which is outputted from the integrating circuit 23 and inputted to the inverting input terminal (−) of the differential amplifier 22 to amplify the difference between $V_1$ and $V_3$ and output the same. The differential amplifier 22 is stabilized by a negative feedback circuit and has no variation in its gains as a circuit, even if there is variation in the gains of the amplifier 22 itself. The above-noted negative feedback circuit 23 amplifies the difference between the voltage inputted to the non-inverting input terminal (−) and the voltage inputted to the inverting input terminal (+) 22.

The Integrating circuit 23 includes a calculating amplifier 25 and a reversal buffer circuit 27. The non-inverting input terminal of the calculating amplifier 25 is grounded. A condenser $C_1$ for integral is connected between the output terminal of the calculating amplifier 25 and the reversal input terminal of the same. The reversal buffer circuit 27 is connected between the output terminal of the calculating amplifier 25 and the reversal input terminal of the differential amplifier 22. The integrating amplifier 23 also includes a small resistor $R_1$ and a large resistor $R_2$ for integration and a switching relay (i.e., integration sensitivity changing means) 50. "Integration sensitivity" herein means the amount of variation of the output value per unit of time relative to the input value of an integrating mechanism. In the case of the integrating circuit 23, the integration sensitivity is represented by the following formula:

$$1/(C_1 \times R_1) \text{ or } 1/(C_1 \times R_2)$$

For the purpose of making this explanation easier, the reciprocal of the above integral sensitivity is hereinafter referred to as "the coefficient of integration". In the case of the integrating circuit 23, the coefficient of integration is represented by "$C_1 \times R_1$" or "$C_1 \times R_2$".

The photometering switch 33 and the releasing switch 35 are connected to the CPU 32 with the photometering switch 33 and the releasing switch 35 distinguished by the pull up resistors $R_4$ and $R_5$, respectively. The switching relay 50 consists of a movable point member 26 and a coil 24 which changes the position of the movable point member 26. The switching relay 50 is actuated by the ON and OFF of the photometering switch 33. When the photometering switch 33 is turned OFF, the movable point member 26 is moved to connect with the small resistor $R_1$, thereby "$C_1 \times R_1$" is set as the coefficient of integration. On the other hand, when the photometering switch 33 is tuned ON, i.e., when the coil 24 is energized by a signal of the CPU 32 at the first predetermined time, the movable point member 26 is moved to connect with the large resistor $R_2$, thereby "$C_1 \times R_2$" is set as the coefficient of integration which is larger than "$C_1 \times R_1$".

Figure 2:
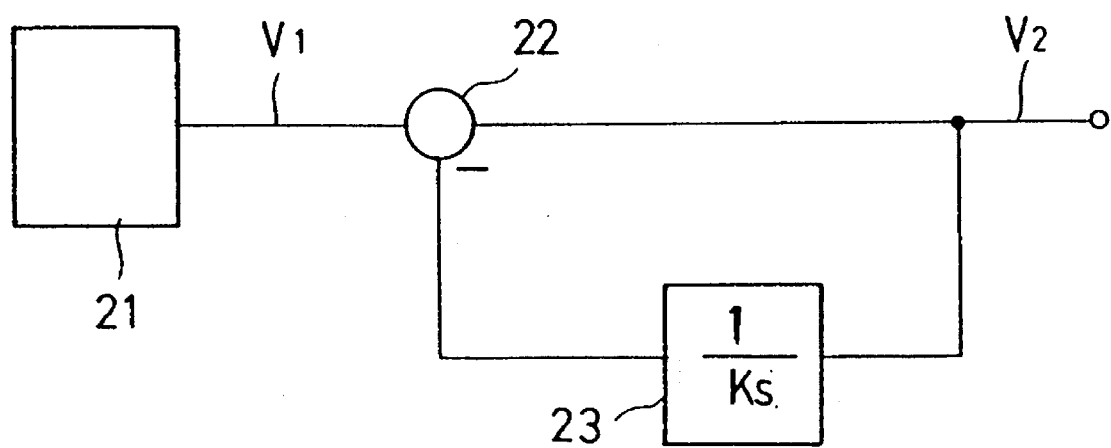
FIG. 2 is a control diagram which expresses the integrating circuit shown in FIG. 1 by using a transform function as an integral factor.
Figure 8:
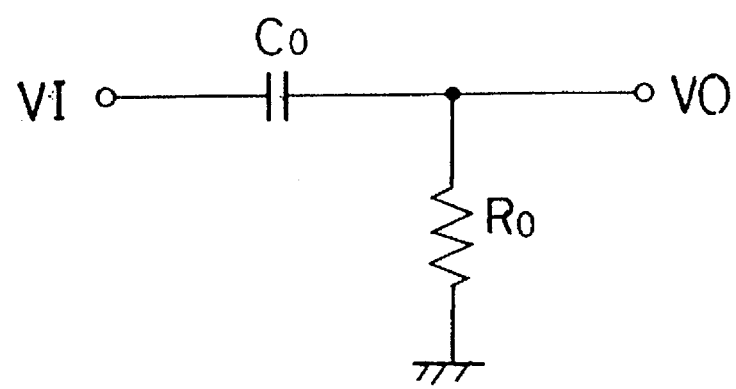

The differential amplifier 22 and the integrating circuit 23 constitute a negative feedback circuit. The negative feedback circuit is represented as shown in FIG. 2 by using the transfer function ($1/K_2$) as an integration factor. Thus, the transmission function of this negative feedback circuit ($V_2/V_1$) is represented by the following equation:

$$V_2/V_1 = 1/[1 + (1/K_s)] = K_s/(1 + K_s)$$

wherein "$K_s$" is the coefficient of integral "$C_1 \times R_1$" or "$C_1 \times R_2$". The form of this equation is similar to that of the transmission function "$VO/VI = T_s/(T_s + 1)$" of the CR direct current cutting circuit shown in FIG. 8. Thereby it can be understood that the negative feedback circuit does the action equivalent to that of the DC filter circuit shown in FIG. 8. In other words, this negative feedback circuit can be said to be a circuit whose cutoff frequency fc is "$1/(2\pi \times K_s)$" and which is equivalent to a high-pass filter.

However, since the integrating circuit 23 includes the switching relay 50 as an integration sensitivity changing mechanism as mentioned above, the movable point member 26 is moved to contact with the small resistor $R_1$ set to the small coefficient of integration before the photometering switch 33 is turned ON. With this apparatus, the problem in which it takes a long time for the residual direct current output to be substantially zero, e.g., immediately after the main switch of the camera is turned ON or after the camera is panned in one direction by a large amount for determining or changing a composition, thereby, missing a good picture can be prevented. Furthermore, the coefficient of integration "$C_1 \times R_1$" of the negative feedback circuit, whose function is substantially the same as that of a high-pass filter and in which the integrating circuit 23 is a feedback factor, is made small to set the cutoff frequency fc as a high-pass filter to be in the high frequency range. Thereby the low frequency component, which includes such as the direct current component of the DC voltage error, of the total voltage inputted from the angular velocity sensor 21 to the differential amplifier 22 can be eliminated for a short period of time. Only the component of angular velocity is outputted as an output $V_s$, and an angular velocity signal $V_2$ is outputted by the differential amplifier 22.

Numeral 29 shown in FIG. 1 is an integrating circuit which changes the angular velocity signal $V_2$ to an angle deviation amount $V_4$. This integrating circuit 29 includes a calculating amplifier 30. A condenser $C_2$ for integration is connected between the output terminal of the calculating amplifier 30 and the reversal input terminal of the same. The non-reversal input terminal of the calculating amplifier 30 is grounded. The integrating circuit 29 further includes a resistor $R_3$ for integration and a switching relay 51 which consists of a movable point member 31 and a coil 28. The switching relay 51 is normally in the state in which the movable point member 31 prevents the angular velocity signal $V_2$ of the differential amplifier 22 from being input to the calculating amplifier 30. When the releasing switch 35 is turned ON, i.e., when the coil 28 is energized by a signal of the CPU 32 at the second predetermined time, the movable point member 31 is moved to connect with the resistor $R_s$, thereby the angular velocity signal $V_2$ is allowed to be inputted to the calculating amplifier 30. When the movable point member 31 is moved to contact with the small resistor R3, the integrating circuit 29 is turned ON and starts to integrate the angular velocity signal $V_2$, changes the angular velocity signal $V_3$, which are input to the integrating circuit 29 immediately after the release button of the camera is fully depressed, to the angular deviation amount $V_4$ and outputs the same.

The controlling circuit shown in FIG. 1, which controls the first driving motor 15, includes a driver 36. The angular deviation amount $V_4$ including the horizontal-directional factor of the integrating circuit 29 is inputted to the non-inverting input terminal of the driver 36. The output $V_{18}$ of the MR sensor 18 is inputted to the inverting input terminal of the driver 36. The driver 36 amplifies the difference between the angular deviation amount $V_4$ and the output $V_{18}$ and then outputs the amplified difference so as to move the blur correcting lens L in the direction opposite to the direction of the camera shake in the horizontal direction.

The controlling circuit (not shown), which is similar to the controlling circuit shown in FIG. 1 and controls the second driving motor 16, includes a driver 35. This driver 36 also amplifies the difference between the angular deviation amount $V_4$ including the vertical-directional factor of the integrating circuit 29 and the output $V_{20}$ of the MR sensor 20 and outputs the amplified difference so as to move the blur correcting lens L in the opposite direction of the camera shake in the vertical direction.

The blur correcting apparatus including the above-noted controlling circuits operates as the follows.

Even if the direct currant component such as DC voltage error is outputted when the main switch of the camera is turned ON in the state where the angular velocity detecting sensor 21 should detect an angular velocity of zero, i.e., where there is no occurrence of camera shake, this direct current component is eliminated within a short period of time since the coefficient of integral "$C_1 \times R_1$" of the negative feedback circuit in which the integration circuit 23 has a small time constant T. Namely, as mentioned above, since the coefficient of integration of the integrating circuit 23 whose function is substantially the same as that of a high-pass filter is set small "$C_1 \times R_1$" and the cuttoff frequency fc is set in the high frequency band, the low frequency component including such a direct current component as the DC voltage error is eliminated within a short period of time. Therefore, such a problem is overcome in which it takes a long time for the residual direct current output to become substantially zero.

In this state, when the photometering switch 33 is turned ON by the release button being depressed in half way, the diaphragm value and exposure time which are necessary for photography are calculated in accordance with a brightness of an object to be photographed, which is detected by a photometering device (not shown) and at the same time the movable point member 26 is switched to the side of the large register $R_2$. Thereby the coefficient of integral of the integrating circuit 23 is set to be "$C_1 \times R_2$", which is larger than "$C_1 \times R_1$". Therefore, since the cutoff frequency fc as a high-pass filter is set to be lower than that before the photometering switch 33 is turned ON, the output $V_1$ of the angular velocity sensor 21 up to its low frequency components are allowed to pass. Consequently, is the output $V_3$, whose direct current component such as the DC voltage error, for example has been eliminated, and the above output $V_1$, which is outputted from the angular velocity sensor 21 is allowed to pass even its low frequency components, are amplified and output from the differential amplifier 22 as angular velocity signal $V_2$.

Thereafter, when the releasing switch 35 and photometering switch 33 are both turned ON by the release button being fully depressed by a photographer after he or she has determined the composition of a picture, the diaphragm of the photographing lens (not shown) is stopped down to start releasing the shutter. When the releasing switch 35 is turned ON, the coil 28 is energized in accordance with a signal outputted from the CPU 32 to move the movable point member 31 to the position at which the movable point member 31 allows the angular velocity signal $V_2$ to be inputted to the calculating amplifier 30. Accordingly, the angular velocity signal $V_2$ whose direct current component such as the DC voltage error, for example has been eliminated is inputted to the integrating circuit 29. Then, this inputted angular velocity signal $V_2$ is converted to the angular deviation amount $V_4$ to output the same.

Thereafter, the driver 36 actuates the first driving motor 15 to rotate in accordance with the angular deviation amount $V_4$ outputted from the integrating circuit 29 and the $V_{18}$ outputted from the MR sensor 18 to move the blur correcting lens L opposite to the direction of a camera shake in the horizontal direction so as to cancel the shake and prevent blurring the film. Similarly, as for the controlling circuit for the second driving motor 16, the driver 36 actuates the second driving motor 16 to rotate in accordance with the angular deviation amount $V_4$ outputted from the integrating circuit 29 and the $V_{20}$ outputted from the MR sensor 20 to move the blur correcting lens L opposite to the direction of the camera shake in the vertical direction so as to cancel the shake and prevent blurring the film. After the blur correcting lens L has offset the shake as mentioned above, the shutter is closed in accordance with the completion of the exposure time and the diaphragm is reset to its primary position.

As can be seen from the foregoing, according to the blur correcting apparatus of the present invention, the influence of the residual direct current output, for example caused by such a direct current component as the DC voltage error and/or a panning can be eliminated prior to taking a picture. When a picture is taken, the blur correcting operation effectively prevents blurring due to camera shake in a wide range of conditions, from a slow shake to a fast shake.

Although the angular velocity sensor 21 is used as a shake detecting means in the first embodiment, the angular velocity sensor 21 may be replaced with an angular acceleration sensor to form a similar controlling circuit. In this similar controlling circuit, instead of the angular deviation amount $V_4$, an angular velocity amount is outputted from the integrating circuit 29. Even so, in this similar controlling circuit, the same blur correcting control as that in the first embodiment can be achieved if a voltage which is in proportion to the angular velocity amount $V_4$ is supplied to the first driving motor 15 (or the second driving motor 16).

Figure 5:
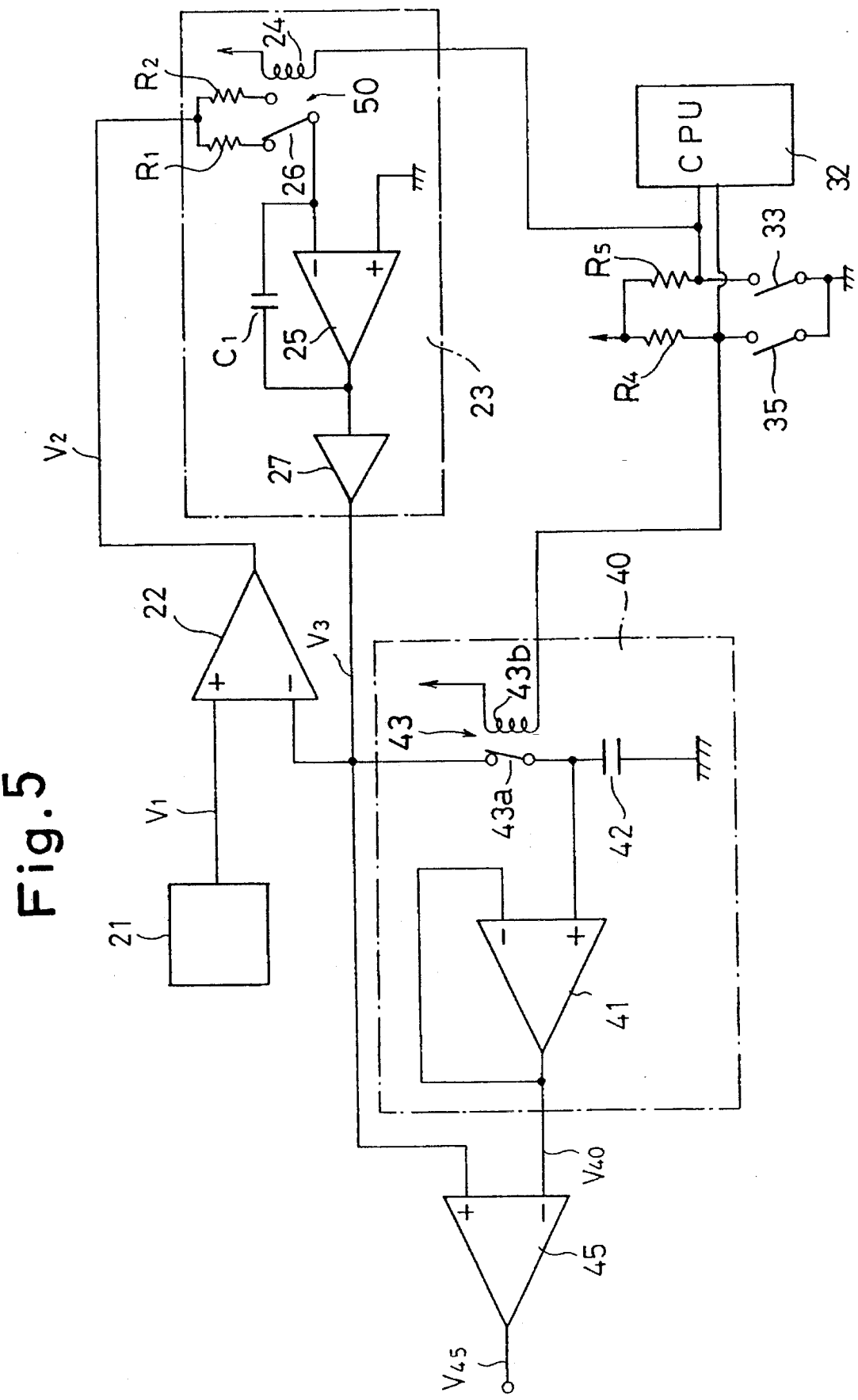
FIG. 5 is an electronic circuit of a blur correcting apparatus of a camera according to the second embodiment of the present invention.

FIG. 5 shows the second embodiment of the present invention. In FIG. 5, the same members as those in FIG. 1 are designated by the same numerals. The controlling circuit shown An FIG. 5 does not include the integrating circuit 29 shown in FIG. 1.

The differential amplifier 22 inputs the output $V_1$ outputted from the angular velocity sensor 21 to the non-inverting input terminal of the differential amplifier 22. The differential amplifier 22 also inputs the output $V_3$ outputted from the integrating circuit 23 to the inverting input terminal of the differential amplifier 22. The angular velocity signal $V_2$ outputted from the differential amplifier 22 is inputted to the integrating circuit 23. The output $V_5$ outputted from the integrating circuit 23 is inputted to the non-inverting input terminal of the differential amplifier 45 and is connected to the input terminal of a voltage holding circuit 40.

The voltage holding circuit 40 includes a calculating amplifier 41. The inverting Input terminal of the calculating amplifier 41 is fed back and the non-inverting input terminal of the same is grounded through a condenser 42 which is for holding a voltage. A switching relay 43 consisting of a movable point member 43a and a coil 43b is provided between the condenser 42 and the input terminal of the voltage holding circuit 40. When the coil 43b is not energized, the movable point member 43a connects to the condenser 42 with the input terminal of the voltage holding circuit 40. When the releasing switch 35 is turned ON, the coil 43b is energized in accordance with a signal outputted from the CPU 32 to move the movable point member 43a to prevent the output $V_2$ of the integrating circuit 23 from being inputted to the voltage holding circuit 40. The voltage holding circuit 40 inputs the output $V_{40}$ thereof to the inverting input terminal of a differential amplifier 45. The differential amplifier 45 inputs the output $V_{45}$ thereof to the driver 36 which has been explained above in reference to FIG. 1.

In this second embodiment, similarly to the first embodiment, DC voltage error, for example outputted in the state where the angular velocity sensor 21 should output only an output of zero are eliminated within a short period of time from the point of time the main switch of the camera is tuned ON, since the coefficient of integration of the integrating circuit 23 is set small as "$C_1 \times R_1$". At this time, since the switching relay 43 is closed, the voltage of the condenser 42 is made to be equal to the output $V_2$ of the integrating circuit 23, and the output $V_{40}$ of the calculating amplifier 41 is also made to be equal to the output $V_2$ of the integrating circuit 23. As such there is no difference in voltage between the non-inverting and inverting input terminals of the differential amplifier 45. Thus the output $V_{45}$ of the differential amplifier 45 is made to be zero.

In this state, when the release button is depressed half-way, the photometering switch 33 is turned ON and the diaphragm value and exposure time which are necessary for photography are calculated in accordance with a detected brightness value. The movable point member 26 is switched to the side of the large register $R_2$ upon the photometering switch 33 being turned ON. Thereby the coefficient of integration of the integrating circuit 23 is set to be "$C_1 \times R_2$", which is larger than "$C_1 \times R_1$". Therefore, similarly to the first embodiment, the output $V_3$ whose direct current component such as DC voltage error, for example has been eliminated and the above output $V_1$ which is outputted from the angular velocity detecting sensor 21 and is allowed to pass including its low frequency portions are output from the differential amplifier 22 and the angular velocity signal $V_2$ to which the above output $V_1$ is properly reflected.

Thereafter, when the releasing switch 35 is turned ON by the release button being fully depressed by a photographer after he or she has determined the composition of the picture, the CPU 32 outputs a signal to turn the switching relay 43 OFF. Thereby the switching relay 43 prevents the output $V_2$ of the integrating circuit 23 from being inputted to the voltage holding circuit 40, and the signal outputted from the angular velocity sensor 21 at this point in time, i.e., the output $V_2$ outputted when the releasing switch 35 is turned ON is stored in the condenser 42.

Consequently, the differential amplifier 45 amplifies the above signal outputted when the releasing switch 35 is turned ON and the subsequent output $V_3$ of the integrating circuit 23 to thereby output the output $V_{45}$. At this time, the DC voltage error generated at the time the releasing switch 35 is tuned ON has already reached a constant value $V_{40}$ from the voltage holding circuit 40 toward the inverting input terminal of the differential amplifier 45. When or after the releasing switch 35 is turned ON, the sum of the above DC voltage error and the integrated value of the output $V_3$ of the differential amplifier 22 has been outputted as the output $V_3$ from the integrating circuit 23 to the non-inverting input terminal of the differential amplifier 45. Since the output $V_{45}$ of the differential amplifier 45 is secured by amplifying the difference between the output $V_2$ and the constant value $V_{40}$, the integration value which is not under the influence of the DC voltage error of the angular velocity sensor 21 is obtained as a precise angle deviation amount. In accordance with this angle deviation amount, the driver 36 actuates the first and second driving motors 15 and 16 to continue to move the blur correcting lens L An the opposite direction of the shake until the output $V_{45}$ of the differential amplifier 45 becomes equal to the output $V_{18}$ of the MR sensor 18 and the output $V_{20}$ of the MR sensor 20, respectively, so as to cancel the camera shake.

Figure 6:
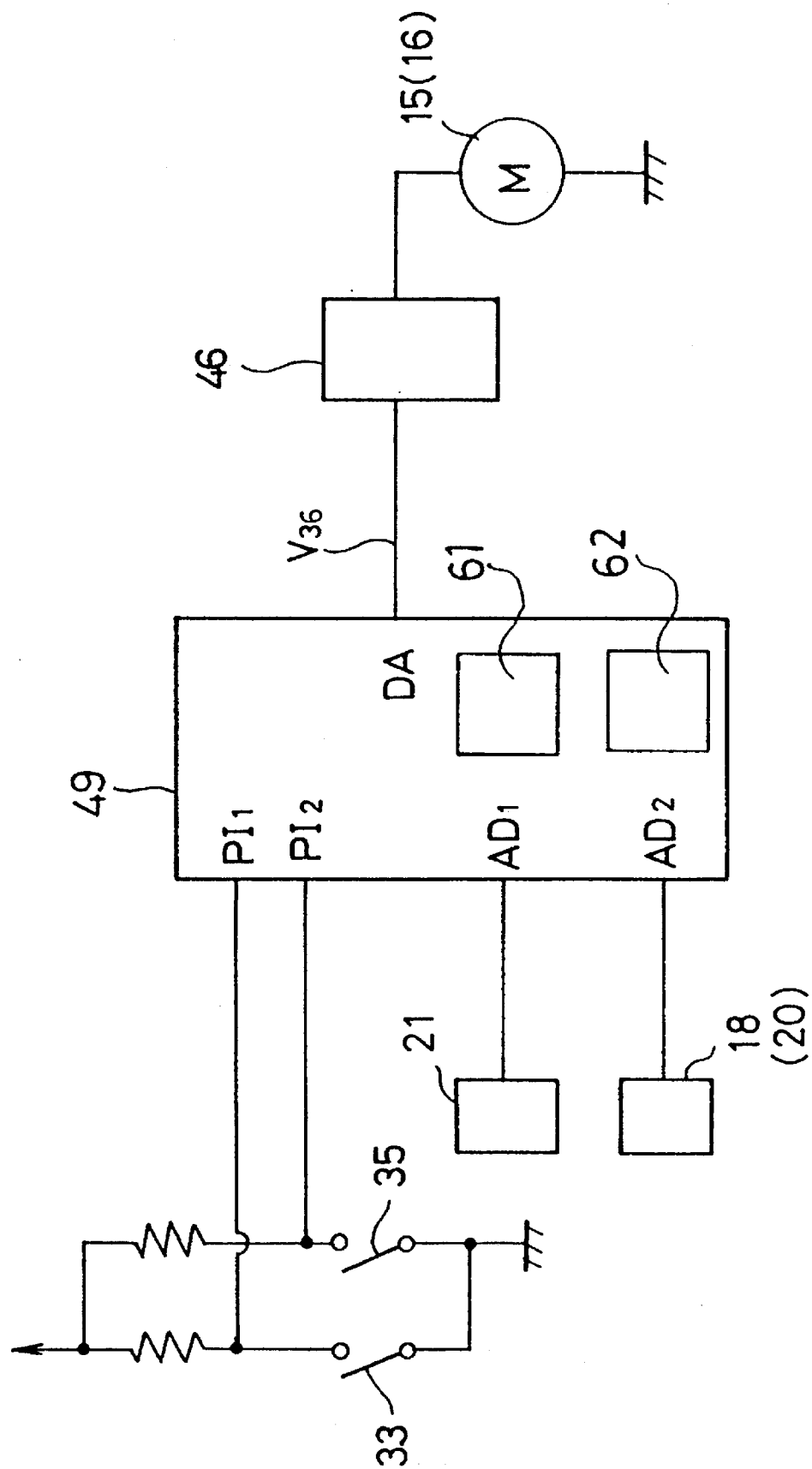
FIG. 6 is an electronic circuit of a blur correcting apparatus of a camera according to the third embodiment of the present invention.

The apparatus of the above first and second embodiments are suitable to the case of having a CPU read the output of the angular velocity sensor 21 so as to handle the above output in software. FIG. 6 shows a circuit which is able to have the functions equivalent to those of the circuit of the first or second embodiment by using a CPU, according to the third embodiment of the present invention. The third embodiment will be explained below.

The photometering switch 33 and the releasing switch 35 are connected to the input ports $PI_1$ and $PI_2$ of a CPU 49, respectively. The angular velocity detecting sensor 21 and the MR sensors 18, 20 are connected to the analog-to-digital conversion input terminals $AD_1$ and $AD_2$ of the CPU 49, respectively. A motor-driving amplifier 46 which amplifies the analog-converted output of the CPU 49 is connected to the digital-to-analog conversion input terminal DA of the CPU 49. The amplifier 49 is connected to the first driving motor 15 (or the second driving motor 16).

The CPU 49 includes a filtering mechanism 61 which filters such direct current components as the DC voltage error from the output of the angular velocity sensor 21. The CPU 49 further includes a pass-band changing mechanism 62 which is actuated at the first predetermined time while the filtering mechanism 61 is filtering such a direct current component as DC voltage error. When the pass-band changing mechanism is actuated, it increases the pass band of the filtering mechanism 61 so that even a low frequency portion of the output of the angular velocity sensor 21 will be passed through the filtering mechanism 61. The amplifier 46 constitutes a driving mechanism for driving the blur correcting, lens L in accordance with the output of the angular velocity sensor 21 which has passed through the increased pass band of the filtering mechanism 61.

Figure 7:
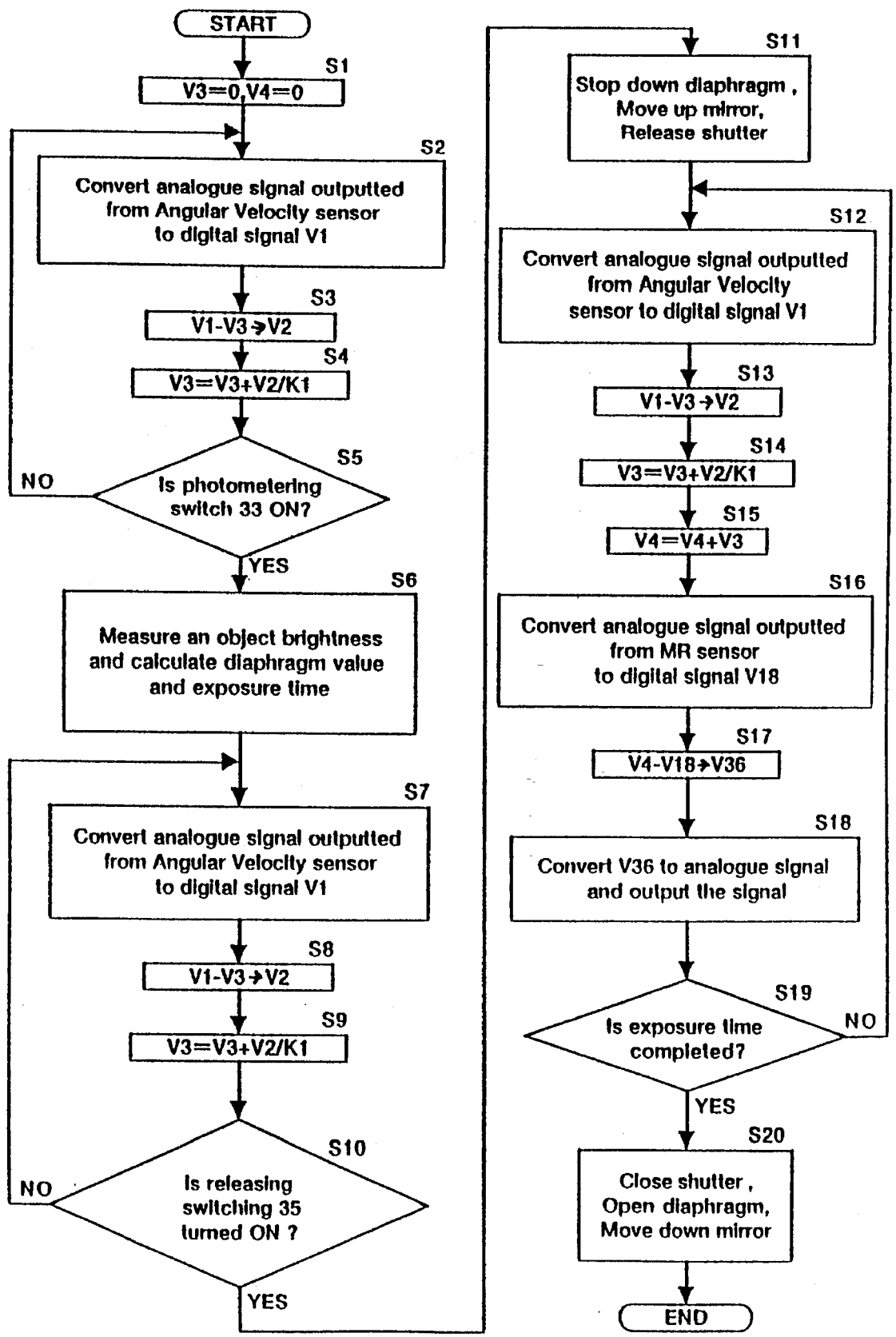
FIG. 7 is a flow chart showing the control of the blur correcting apparatus, according to the third embodiment of the present invention; and, FIG. 8 is a circuit, shown as an example, of a condenser resistor DC filter circuit (CR direct current filter circuit).

FIG. 7 shows a flow chart of the program which is accomplished by the controlling circuit using the CPU 49 shown in FIG. 6. With this program, the controlling circuit of FIG. 6 is able to have the functions equivalent to those of the circuit of the first embodiment shown in FIG. 1. In FIG. 7, Steps 3, 8 and 13 correspond to the function of the differential amplifier 22 shown in FIG. 1, Steps 4, 9 and 14 correspond to function of the the integrating circuit 23 shown in FIG. 1. Step 15 corresponds the function of the integrating circuit 29 shown in FIG. 1, respectively. "$V_1$" through "$V_s$" shown in FIG. 7 are the variables used in the program which correspond to those in FIG. 1.

When the main switch of the camera is turned ON, the CPU 49 clears, the previous variables $V_2$ and $V_4$, corresponding to the outputs $V_3$ and $V_4$ of the integrating circuits 23 and 29 shown in FIG. 1, respectively, and converts the analog signal outputted from the angular velocity sensor 21 to a digital signal by inputting the analog signal to the input terminal $AD_1$ to thereby output the digital signal as a digital signal $V_1$ (S1 and S2). Thereafter, the filtering mechanism 61 calculates the value $V_2$ based on the digital signals $V_1$ and $V_3$ (S3). Thereafter, based on the digital signal $V_3$, the value $V_2$ and a coefficient $K_1$, the filtering mechanism 61 further calculates a new $V_3$ to eliminate the influence due to such a direct current component as the DC voltage error (S4). At S5, the control checks whether or not the photometering switch 33 is turned ON and continues to perform the looped steps including S2 to S5 until the photometering stitch 33 is turned ON, i.e., until the release button is depressed half-way.

In this state, when the photometering switch 33 is turned ON by the release button being depressed half-way, the diaphragm value and exposure time which are necessary for photography are calculated in accordance with a detected brightness value (S6). At the same time, a new $V_2$ is calculated based on another digital signal $V_1$, which has been inputted and converted from the analog signal outputted from the angular velocity sensor 21, and the above new $V_3$ whose influence due to such a direct current component as the DC voltage error has been eliminated. Furthermore, the pass-band changing mechanism 62 adds the above new $V_3$ to the value of the new $V_2$ divided by the coefficient $K_2$ which is larger than the coefficient $K_1$ of S4 to make the output of the angular velocity sensor 21 a new $V_3$ which makes the output of the angular velocity sensor 21 up to its low frequency range to be passed (S7 to S9). The coefficients $K_1$ and $K_2$ is correspond to the coefficients of integration "$C_1 \times R_1$," and "$C_1 \times R_3$" used in the above first or second embodiment (i.e., the time constant T of the CR direct current cutting circuit), respectively. The coefficient $K_2$ is set to be larger than the coefficient $K_1$.

Thereafter, when the releasing switch 35 and photometering switch 33 are both turned ON by the release button being fully depressed by a photographer after he or she has determined the composition of a picture, the diaphragm of the photographing lens (not shown) is stopped down, the quick-return mirror is moved up and the shutter starts to be released (S11). At the same time, a new $V_2$ is calculated based on another digital signal $V_1$, which has been inputted and converted from the analog signal outputted from the angular velocity sensor 21, and the above new $V_3$ whose influence due to such a direct current component as DC voltage error has been eliminated. Thereafter, the pass-band changing mechanism 62 adds the value of the above new $V_2$ divided by the coefficient $K_2$ to the above new $V_3$, and then adds this new $V_3$ to the output $V_4$ to thereby convert the output $V_4$ to an angle deviation amount $V_4$ whose influence due to such a direct current component as the DC voltage error has been eliminated (S12 to S15). Thereafter, the output of the MR sensor 18 is converted to a digital signal $V_{18}$, a driving signal $V_{36}$ is calculated in accordance with the above $V_4$ and the digital signal $V_{18}$, and the driving signal $V_{36}$ is converted to an analogue signal to output it to an amplifier 46 for driving the motor (S16 to S18).

Thereafter, the amplifier 46 actuates the first driving motor 15 (or the second driving motor 16) to rotate in accordance with the driving signal $V_{36}$ to move the blur correcting lens L opposite to the direction of a camera shake so as to cancel the shake causing blur on the film. After the blur correcting lens L has cancelled the shake, the shutter is closed in accordance with the completion of the exposure time the diaphragm is opened and the quick-mirror is moved down (S19, S20).

Although the angular velocity sensor 21 is used as a shake detecting mechanism in the second and third embodiments, an angular acceleration sensor may be used as a shake detecting mechanism instead.

Although the mechanical-type switching relays 50, 51 and 43 are used as mechanism for changing the coefficient of integration, mechanism for changing the input inputted to the integrating circuit 29, and mechanism for changing the input inputted to the voltage holding circuit 40, respectively, electrical switching relays such as transistors or digital resistors may be used instead.

As can be seen from the foregoing, according to the present invention, a blur correcting apparatus of a camera can be provided which eliminates the influence of the residual direct current output, for example caused by such a direct current output as DC voltage error and/or a panning prior to taking a picture. Also, the blur correcting apparatus provides a blur correcting operation which is effective at the low band of the output signals outputted from a shake detecting mechanism such as an angular velocity or acceleration sensor.

I claim:

1. A blur correcting apparatus for a camera comprising:

shake detecting means for detecting a shake of said camera and providing an output, said output having a frequency;

a blur correcting optical element which is movable in a plane normal to an optical axis of a photographing lens of said camera;

means for filtering said output from said shake detecting means and outputting a filtered output said filtering means having a first predetermined filtering level by which a first minimum frequency of said filtered output is determined;

means for varying said filtering means to have a second predetermined filtering level by which a second predetermined minimum frequency of said filtered output is determined, wherein said first minimum frequency is higher than said second minimum frequency; and means for moving said blur correcting optical element in accordance with said filtered output;

wherein said filtering means has said second predetermined filtering level when a picture is taken.

2. A blur correcting apparatus according to claim 1, wherein said means for varying is operated in association with said photometering switch.

3. A blur correcting apparatus according to claim 1, wherein said means for varying, varies said filtering means, upon actuation of a photometering switch of said camera, to have said second predetermined filtering level.

4. A blur correcting apparatus of a camera having a blur correcting optical system, said apparatus comprising:

shake detecting means for detecting a shake of a photographing optical axis of said camera with respect to an object to be photographed;

a first differential amplifier which outputs a difference between a first output outputted from said shake detecting means and a second output;

integrating means for integrating said output from said first differential amplifier and outputting said second output;

integral sensitivity changing means for changing an integral sensitivity of said integrating means from a high sensitivity to a low sensitivity at a first predetermined time;

memory means for storing a value of an output outputted from said integrating means at a second predetermined time;

a second differential amplifier which outputs a difference between an output outputted from said memory means and an output outputted from said integrating means; and, means for driving said blur correcting optical system in accordance with said output outputted from said second differential amplifier.

5. A blur correcting apparatus of a camera having a blur correcting optical system comprising:

shake detecting means for detecting a shake of a photographing optical axis of said camera with respect to an object to be photographed;

filtering means for eliminating a direct current component from an output outputted from said shake detecting means;

pass-band changing means, which is actuated while said filtering means is eliminating said direct current component, for expanding a pass band of said filtering means; and means for driving said blur correcting optical system in accordance with an output of said shake detecting means.

6. The blur correcting apparatus of claim 3 further comprising second integrating means for starting an integration of an output of said second differential amplifier at the second predetermined time to obtain a shake deviation amount.

7. The blur correcting apparatus of claims 4 further comprising a photometering switch, a releasing switch, and a release button associated with said photometering switch and said releasing switch, wherein said first and second predetermined times correspond to a time when said photometering switch is turned ON and a time said releasing switch is turned ON, respectively.

8. A blur correcting apparatus according to claim 5, wherein said pass-band changing means is actuated by actuation of a photometering switch, while said filtering means is eliminating said direct current component, for expanding a pass band of said filtering means.

9. A method for correcting blur of a camera having shake detecting means for detecting a shake of said camera and providing an output, a blur correcting optical element which is movable in a plane normal to an optical axis of said camera, means for filtering said output of said shake detecting means, means for moving said optical element based upon an output of said filtering means and means for switching a frequency range to be filtered from an output of said shake detecting means by said filtering means before and during taking of a picture by said camera, said method comprising:

filtering a first specific frequency range from an output of said shake detecting means by said filtering means before taking of a picture by said camera; and filtering a second specific frequency range, which is different from said first specific frequency range, from an output of said shake detecting means by said filtering means while taking a picture with said camera.

10. A method according to claim 9, wherein an upper limit of said first specific frequency range is higher than an upper limit of said second specific frequency range.

11. A method according to claim 9, further comprising:

actuating said filtering of said second specific frequency range by actuation of a photometering switch of said camera.

12. A blur correcting apparatus for a camera having a blur correcting optical system comprising:

shake detecting means for detecting a shake of a photographing optical axis of said camera with respect to an object to be photographed;

a differential amplifier which outputs a difference between a first output outputted from said shake detecting means and a second output;

integrating means for integrating said output from said differential amplifier and outputting said second output;

integral sensitivity changing means for changing an integral sensitivity of said integrating means from a high sensitivity to a low sensitivity at a first predetermined time; and means for driving said blur correcting optical system in accordance with an output outputted from said differential amplifier in which said sensitivity is changed from said high sensitivity to said low sensitivity.

13. A blur correcting apparatus for a camera comprising:

shake detecting means for detecting a shake of said camera and providing an output;

a blur correcting optical element which is movable in a plane normal to an optical axis of said camera;

means for filtering said output from said shake detecting means;

means for moving said blur correcting optical element based upon an output of said filtering means; and means for switching between a first frequency range to be filtered from said output of said shake detecting means by said filtering means before a picture taking operation, and a second frequency range to be filtered from said output of said shake detecting means by said filtering means at a picture taking operation, wherein said first frequency range is greater than said second frequency range.

14. A blur correcting apparatus according to claim 13, wherein said means for switching switches between said first frequency range to be filtered and said second range to be filtered upon activation of a photometering switch of said camera.

* * * * *

UNITED STATES PATENT AND TRADEMARK OFFICE
CERTIFICATE OF CORRECTION

PATENT NO. : 5,583,597
DATED : December 10, 1996
INVENTOR(S) : Shigeo ENOMOTO

It is certified that error appears in the above-indentified patent and that said Letters Patent is hereby corrected as shown below:

At column 14, line 10 (claim 1, line 9), change "output" to ---output,---.

At column 15, line 6 (claim 6, line 1), change "3" to ---4---.

Signed and Sealed this

First Day of April, 1997

BRUCE LEHMAN

Attest:

Attesting Officer

Commissioner of Patents and Trademarks